US009444342B2

United States Patent
Childs

(10) Patent No.: US 9,444,342 B2
(45) Date of Patent: Sep. 13, 2016

(54) CLOCKED PULSE FREQUENCY MODULATION BUCK DC-TO-DC CONVERTER

(71) Applicant: Dialog Semiconductor (UK) Limited, Reading (GB)

(72) Inventor: Mark Childs, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/516,859

(22) Filed: Oct. 17, 2014

(65) Prior Publication Data

US 2016/0111956 A1 Apr. 21, 2016

(30) Foreign Application Priority Data

Oct. 15, 2014 (EP) .................................. 14189109

(51) Int. Cl.
*H02M 3/158* (2006.01)
*H02M 3/155* (2006.01)
*H02M 3/156* (2006.01)
*H02M 1/00* (2006.01)

(52) U.S. Cl.
CPC ............. *H02M 3/158* (2013.01); *H02M 3/155* (2013.01); *H02M 3/156* (2013.01); *H02M 3/1582* (2013.01); *H02M 3/1588* (2013.01); *H02M 2001/0032* (2013.01); *H02M 2003/1566* (2013.01)

(58) Field of Classification Search
CPC ..................................................... H02M 3/156
USPC ........................................ 323/271, 284, 222
See application file for complete search history.

(56) References Cited

U.S. PATENT DOCUMENTS

| 8,283,907 | B1 | 10/2012 | Jayaraj |
| 2005/0111149 | A1 | 5/2005 | Motomori |
| 2005/0116697 | A1 | 6/2005 | Matsuo et al. |
| 2007/0159151 | A1 | 7/2007 | Katoh et al. |
| 2009/0040791 | A1 | 2/2009 | Qahouq et al. |
| 2009/0079408 | A1 | 3/2009 | Qiao et al. |
| 2009/0322300 | A1* | 12/2009 | Melanson ........... H02M 3/1563 323/284 |

(Continued)

OTHER PUBLICATIONS

"Dithering Skip Modulation, Width and Dead Time Controllers in Highly Efficient DC-DC Converters for System-On-Chip Applications," by Hong-Wei Huang, et al., IEEE Journal of Solid-State Circuits, vol. 42, No. 11, Nov. 2007, pp. 2451-2465.

(Continued)

*Primary Examiner* — Jeffrey Gblende
*Assistant Examiner* — Trinh Dang
(74) *Attorney, Agent, or Firm* — Saile Ackerman LLC; Stephen B. Ackerman; Billy Knowles

(57) ABSTRACT

A hysteretic mode control circuit within a DC-to-DC converter is configured for varying the current limit that controls the switching interval and duration of a power switching section of the DC-to-DC converter to permit the DC-to-DC converter to manage large changes in output current load of the DC-to-DC converter. The hysteretic mode control circuit has a positive and a negative current limit section that develop a first and a second reference signal for turning on and turning off the first and the second switching device. The first and second reference signals are compared to an output voltage of the power switching section to determine if the first switching device or the second switching device is to be turned on or turned off.

21 Claims, 9 Drawing Sheets

(56) References Cited

U.S. PATENT DOCUMENTS

2012/0286576 A1* 11/2012 Jing ............ H02M 3/156 307/43
2015/0091544 A1* 4/2015 Jayaraj ......... H02M 3/156 323/284

OTHER PUBLICATIONS

"An Accurate, Low-Voltage, CMOS Switching Power Supply With Adaptive On-Time Pulse-Frequency Modulation (PFM) Control," by Biranchinath Sahu, et al., IEEE Transactions on Circuits and Systems—I: Regular Papers, vol. 54, No. 2, Feb. 2007, pp. 312-321.

"A Fully-Integrated 3-Level DC-DC Converter for Nanosecond-Scale DVFS," by Wonyoung Kim, et al., IEEE Journal of Solid-State Circuits, vol. 47, No. 1, Jan. 2012, pp. 206-219.

"A DC-DC Buck Converter Chip with Integrated PWM/PFM Hybrid-Mode Control Circuit," by Yie-Tone Chen, et al., International Conference on Power Electronics and Drive Systems, 2009, Nov. 2009, pp. 181-186.

"An Exact, High-Efficiency PFM DC-DC Boost Converter with Dynamic Stored Energy," by Hou-Ming Chen, et al., 15th IEEE International Conference on Electronics, Circuits and Systems, 2008. ICECS 2008, Aug. 31 to Sep. 3, 2008, pp. 622-625.

European Search Report 14189109.3-1809, May 6, 2015, Dialog Semiconductor (UK) Ltd.

\* cited by examiner

CLOCKED PULSE FREQUENCY MODULATION BUCK DC-TO-DC CONVERTER

TECHNICAL FIELD

This disclosure relates generally to circuits and methods for controlling operation of switching power converters. More particularly, the present disclosure relates to circuits and methods for controlling operation of a pulse frequency modulated buck DC-to-DC converter to decrease noise coupling and permit a variable current to accommodate large output currents.

BACKGROUND

As is known in the art, a buck DC-to-DC converter is a voltage step down and current step up converter. A buck DC-to-DC converter has a power switching section and a low pass filter section. The power switching section reduces the DC component of the power supply voltage source and the filter section removes the high frequency harmonics created by the power switching section to generate the desired DC output voltage level.

The power switching section has a first switch with a first terminal connected to one terminal of a power supply voltage source. The power supply voltage source may be a battery or the rectified AC power mains. The second terminal of the first switch is connected to a filter section of the buck DC-to-DC converter. A second switch in the power switching section has a first terminal connected to a ground reference voltage terminal. The second terminal of the second switch is connected to the second terminal of the first switch and the filter section of the buck DC-to-DC converter. The first and second switches each have a control terminal that is connected to control circuitry that determines the switching frequency and duration of the activations of the first and second switches based on a feedback signal from an output of the buck DC-to-DC converter.

The input of the filter section is a first terminal of an inductor and the second terminal of the inductor is connected to a first terminal of a filter capacitor. The second terminal of the filter capacitor is connected to the ground reference voltage terminal. The output of the buck DC-to-DC converter is the common connection of the second terminal of the inductor and the first terminal of the filter capacitor. A sense circuit is commonly applied to the output terminal of the buck DC-to-DC converter to provide the feedback signal for the control circuitry.

The buck DC-to-DC converter operates in a continuous, synchronous, or pulse width modulated mode for higher current or heavily loaded operation. The first and second switches are activated and deactivated at a fixed frequency and the period between each activation and deactivation is determined by comparing the feedback signal with a desired reference signal to create the desired output voltage. When the buck DC-to-DC converter operates in a discontinuous, asynchronous or pulse frequency modulated mode for low current or lightly loaded operation, the switches do not supply the current from the power supply voltage source on each cycle and the current then supplied during the commutation mode where current is provided from the collapsing field of the inductor. Often the discontinuous mode is used in portable electronics such as smart cellular telephones, tablet computers, digital readers, etc. as a "sleep mode". The only current required by the system in these applications is monitoring current for system maintenance (i.e. system clocking and timers, cellular network monitoring, wireless network monitoring).

In the pulse frequency modulation mode, the buck DC-to-DC converter turns on the first switch to apply the power supply voltage source to the inductor when the output voltage falls below a reference voltage. The first switch is then turned off when the current in the coil reaches a threshold value (sleep current limit). The second switch is turned on when the first switch is turned off. The second switch is then turned off when the current in the coil is fully discharged. The pulse frequency modulation mode is not typically used for large currents as the current limit is normally set low to maximize efficiency.

Buck DC-to-DC converter converters operate in the pulse frequency modulation mode have serious problems with noise coupling when operating a high current levels. Further, when the second switch is open, there is no path from the filter section for negative currents resulting from overvoltage situations at the output of the buck DC-to-DC converter.

SUMMARY

An object of this disclosure is to provide circuits and methods for operating a buck DC-to-DC converter in a pulse frequency mode with variable current limits to provide the ability to manage large output currents.

Another object of this disclosure is to provide circuits and methods for operating a buck DC-to-DC converter in hysteretic mode where switching of the power supply voltage source is governed by output current and voltage thresholds.

To accomplish at least one of these objects, a hysteretic mode control circuit within a DC-to-DC converter. The hysteretic mode control circuit is configured for varying the current limit that controls the switching interval and duration of a power switching section of the DC-to-DC converter to permit the DC-to-DC converter to manage large changes in its output current load.

The hysteretic mode control circuit has a positive current limit circuit and a negative current limit circuit. The positive current limit circuit is configured for determining a first reference voltage that is used for controlling activation a first switching device of a switching section of the DC-to-DC converter for transferring current to a load device placed at the output of the DC-to-DC converter. In some embodiments, the positive current limit circuit has a first matching switching device having geometry and impurity implantations matching the first switching device. The matching switching device is connected to a first reference current source configured to develop a first reference limit signal for turning on and turning off the first switching device. The first reference limit signal is compared to an output voltage of the power switching section to determine if the first switching device is to be turned on or turned off.

In some embodiments, the negative current limit circuit is configured for determining a second reference voltage that is used for controlling activation a second switching device of a switching section of the DC-to-DC converter for accepting current from the DC-to-DC converter. In some embodiments, the negative current limit circuit has a second matching switching device having geometry and impurity implantations matching the first switching device. The matching switching device is connected to a second reference current source configured to develop a second reference limit signal for turning on and turning off the second switching device. The second reference limit signal is compared to the output voltage of the power switching section to determine if the second switching device is to be turned on or turned off.

In other embodiments, the positive current section has a dynamic current limit circuit that has a first reference current source providing a maximum reference current to a reference leg of a first current mirror. A mirror leg of the first current mirror is connected to provide a reference limit voltage for an output of the positive current section to determine the switching interval and duration of the first switching device of the power switching section to provide current to the filter section of the DC-to-DC converter. A feedback signal from the output of the DC-to-DC converter and a first reference voltage are inputs to a comparator for determining if the feedback signal is greater than or less than the first reference voltage. An output of the comparator is an input to a switching device that is activated or deactivated to divert current from the reference leg of the current mirror and thus modify the current in mirror leg of the current mirror and thus adjust the voltage level of the reference limit voltage.

A load device is connected to the mirror leg of the current mirror for developing the reference limit voltage. In various embodiments, the dynamic current limit circuit has a second current source connected in parallel with the mirror leg of the current mirror to provide an optional minimum reference current.

In various embodiments, hysteretic mode control circuit has a variable current limit circuit. A driver control circuit receives a first control signal developed by a comparison of a feedback signal from the output of the DC-to-DC converter with a reference voltage and a second control signal developed by the variable current limit circuit for controlling activation the first switching device of a switching section of the DC-to-DC converter for transferring current to a load device placed at the output of the DC-to-DC converter.

The variable current limit circuit is configured for determining the second control signal by sensing a voltage level present at the input to the low pass filter of the DC-to-DC converter. The voltage level sensing signal is applied to a first terminal of a adjustable differential current source. A control terminal of the differential current source is controlled by the comparison of the feedback signal from the output of the DC-to-DC converter with the reference voltage. The second control signal developed across the adjustable differential current source is applied to the driver control circuit to permit activation of the first and second switching devices according to the level of the necessary voltage across or current through the low pass filter.

In various embodiments, a compensation current source is connected in parallel with the differential current source. The compensation current source provides a fixed ramp current that is summed with the differential current source for providing compensation to prevent sub-harmonic oscillation.

In various embodiments that accomplish at least one of these objects, a DC-to-DC converter includes a hysteretic mode control circuit configured for varying the current limit that controls the switching interval and duration of a power switching section of the DC-to-DC converter to permit the DC-to-DC converter to manage large changes in output current load of the DC-to-DC converter.

In various embodiments that accomplish at least one of these objects, a method for providing hysteretic mode control within a DC-to-DC converter. The method provides the mode control through a hysteretic mode control circuit that varies the current limit that controls the switching interval and duration of a power switching section of the DC-to-DC converter to permit the DC-to-DC converter to manage large changes in output current load of the DC-to-DC converter.

The method begins by determining a limit signal proportional to a positive limit current and a negative limit current for the current flowing in the low pass filter of the DC-to-DC converter. In various embodiments, the limit signal is a voltage that is compared to a voltage that is developed at the input of the low pass filter of the DC-to-DC converter. If a positive voltage that is developed at the input of the low pass filter of the DC-to-DC converter is greater than a positive limit signal voltage, a first latching circuit is reset and a positive switching device is disabled to prevent current from flowing into the low pass filter. Alternately, if the positive voltage that is developed at the input of the low pass filter of the DC-to-DC converter is less than the positive limit signal voltage, the first latching circuit is not reset and the positive switching device is enabled to allow current to flow into the low pass filter.

If a negative voltage that is developed at the input of the low pass filter of the DC-to-DC converter is greater than a negative limit signal voltage, a second latching circuit is reset and a negative switching device is disabled to prevent current from flowing from the low pass filter. Alternately, if the negative voltage that is developed at the input of the low pass filter of the DC-to-DC converter is less than the negative limit signal voltage, second first latching circuit is not reset and the negative switching device is enabled to allow current to flow from the low pass filter.

In some embodiments, first setting a maximum reference current and a minimum reference current develop the positive and negative limit signals. A difference between a reference voltage of the DC-to-DC converter and a feedback voltage of the DC-to-DC converter is determined as difference voltage. The difference voltage is converted to a difference current. The difference current is subtracted from the maximum reference current to form a variable limit current. A positive variable limit current is mirrored and converted to the positive limit signal and a negative variable limit current is mirrored and converted to the negative limit signal.

DETAILED DESCRIPTION

Figure 1:
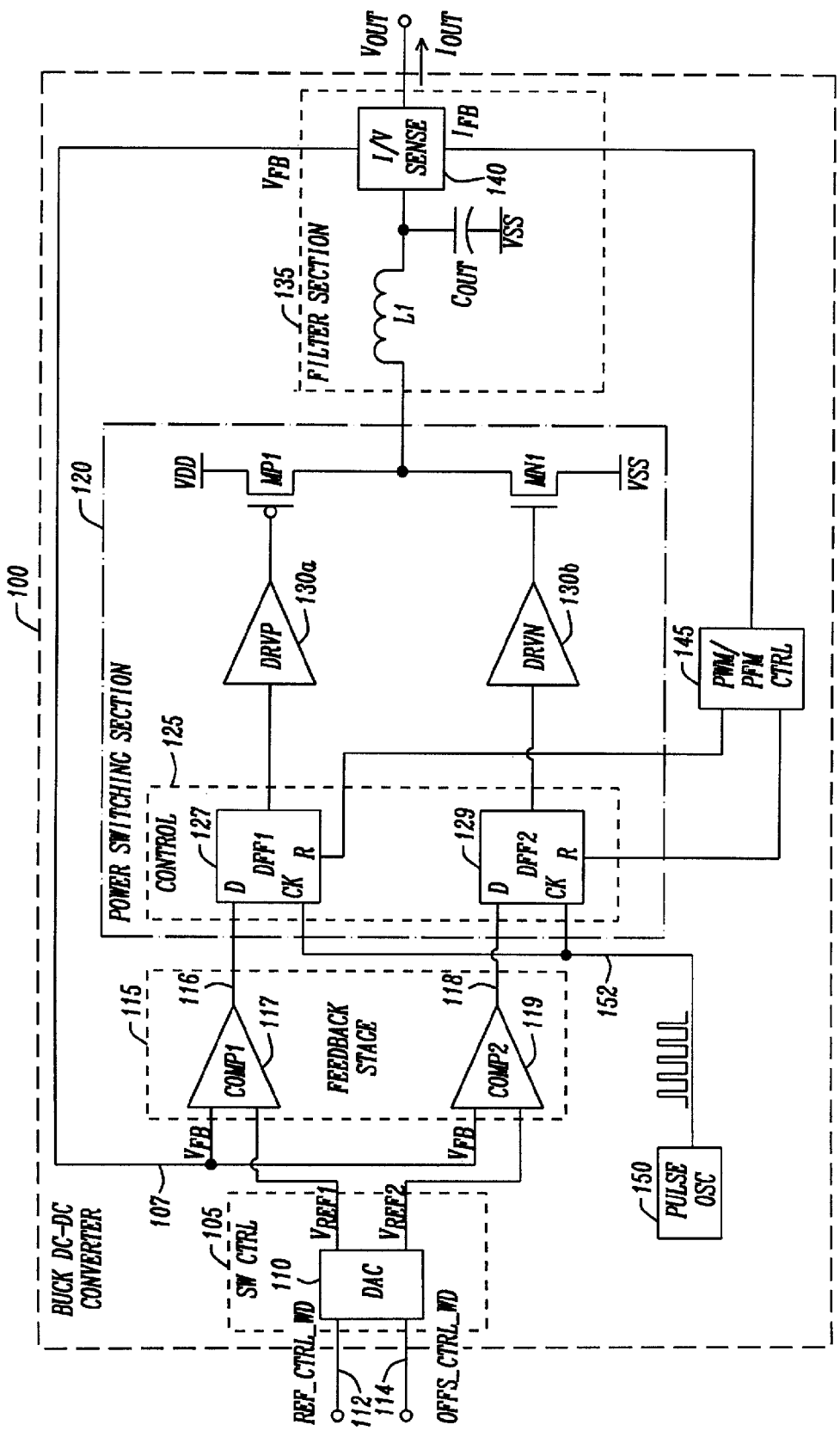
FIG. 1 is a schematic of a DC-to-DC converter operating with a pulse width modulation mode and pulse frequency modulation mode.

FIG. 1 is a schematic of a DC-to-DC converter operating with a pulse width modulation mode and pulse frequency modulation mode. The power switching section 120 has a switching control circuit 125 that generates control signals that are applied to a positive input of a driver circuit 130a and a negative input of a driver circuit 130b. The output of the driver circuit 130a is applied to the gate of the PMOS transistor MP1 and the output of the driver circuit 130b is applied to the gate of the NMOS transistor MN1. The source of the PMOS transistor MP1 is connected to the power supply voltage source VDD and the source of the NMOS transistor MN1 is connected to the substrate supply voltage source VSS. The substrate supply voltage source VSS is often the ground reference voltage source, but in some applications is a negative voltage level. The commonly connected drains of the PMOS transistor MP1 and the NMOS transistor MN1 are connected to an input terminal of the filter section 135. The input terminal is a first terminal of an inductor L1. The control circuit 125 determines that during the continuous mode or pulse width modulation mode the control signals 116 and 118 are applied to the driver circuit 130a and the driver circuit 130b such that the PMOS transistor MP1 is turned on and the NMOS transistor MN1 is turned off, a current from the power supply voltage source VDD from the first terminal of the inductor L1 out the second terminal of the inductor L1 into the first terminal of the output capacitor $C_{OUT}$ and to the substrate supply voltage source VSS. The output voltage $V_{OUT}$ is present at the junction of the second terminal of the inductor L1 and the output capacitor $C_{OUT}$.

It is known in the art, that the voltage ($V_{L1}$) across the inductor L1 is determined by the formula:

$$V_{L1} = L\frac{dI_L}{dt}$$

The output voltage $V_{OUT}$ is equal to the difference of the power supply voltage source VDD and the voltage $V_{L1}$ across the inductor L1 in the on state and equal to the negative of the voltage $-V_{L1}$ across the inductor L1 in the off state. The duty cycle of the buck DC-to-DC converter determines the on state time and the off state time. It can be shown that the output voltage $V_{OUT}$ is equal to the duty cycle of the buck DC-to-DC converter multiplied by the voltage level of the power supply voltage source VDD.

The feedback stage 140 has three inputs. The first input 107 is the feedback voltage $V_{FB}$ that is developed from the output voltage $V_{OUT}$ at common connection of the second terminal of the inductor L1 and the first terminal of the output capacitor $C_{OUT}$. The second and third inputs are the first and second reference voltages $V_{REF1}$ and $V_{REF2}$ generated by the switch control circuit 105. The switch control circuit 105 has a digital-to-analog converter 110 that receives a reference control word 112 and an offset control word 114. The digital-to-analog converter 110 converts the reference control word 112 to the first reference voltage $V_{REF1}$ and the offset control word 114 to the second reference voltage $V_{REF2}$. The first reference voltage $V_{REF1}$ and the second reference voltage $V_{REF2}$ are the second and third inputs to the feedback stage 115. The feedback control stage 115 has a first comparator 117 for providing a first control signal 116 and a second comparator 119 for providing a second control signal 118. The first control signal 116 is applied to a data input D of a first data flip-flop 127 of the switching control circuit 125. The second control signal 118 is applied to a data input D of a second data flip-flop 129 of the switching control circuit 125. An oscillator 150 generates the clock pulse signal 152 that is applied to the clock CK input of the first data flip-flop 127 and the second data flip-flop 129. The output of the first data flip-flop 127 is applied to the input of the positive driver circuit 130a and the output of the second data flip-flop 129 is applied to the input of the negative driver circuit 130b. The output of the first driver circuit 130a is applied to the gate of the PMOS transistor MP1 and the output of the second driver circuit 130b is applied to the gate of the NMOS transistor MN1.

A current/voltage sense circuit 140 is placed at the junction of the second terminal of the inductor L1 and the output capacitor $C_{OUT}$. The current/voltage sense circuit 140 determines the feedback voltage $V_{FB}$ and the feedback current $I_{FB}$. The feedback voltage $V_{FB}$ is fed back as the first input to the first comparator 117 and the second comparator 118. The feedback current $I_{FB}$ is fed back to a pulse width modulation/pulse frequency modulation control circuit 145. Based on the feedback current $I_{FB}$ as determined by the load current $I_{OUT}$, the pulse width modulation/pulse frequency modulation control circuit 145 resets the first data flip-flop 127 and the second data flip-flop 129. If the DC-to-DC converter is operating in the pulse width modulation mode, the first data flip-flop 127 and the second data flip-flop 129 are not reset and the data outputs of the first data flip-flop 127 and the second data flip-flop 129 are controlled by the feedback voltage $V_{FB}$ to determine the pulse width of the control signals driving the first driver circuit 130a and the second driver circuit 130b and thus the PMOS transistor MP1 and the NMOS transistor MN1.

When the load current $I_{OUT}$ decreases to a predetermined level, the DC-to-DC converter is set to the pulse frequency modulation mode. The feedback current $I_{FB}$ is interpreted by the pulse width modulation/pulse frequency modulation control circuit 145 such that the second data flip-flop 129 is reset. This turns off the NMOS transistor MN1. The pulse width modulation/pulse frequency modulation control circuit 145 resets the first data flip-flop 127 and the PMOS transistor MP1 is turned off. If the output voltage $V_{OUT}$ decreases below a threshold, the output current $I_{OUT}$ is increasing and the pulse width modulation/pulse frequency modulation control circuit 145 releases the reset of the first data flip-flop 127 to activate the PMOS transistor MP1 to allow current to flow into the filter section 135.

Since the NMOS transistor MN1 is turned off, the DC-to-DC converter can not accept current from the load, therefore any overvoltage of the output voltage $V_{OUT}$ is not discharged. Further, the PMOS transistor MP1 is turned on asynchronously at high load creating serious implications for noise being coupled to the system that is load being powered.

Figure 2:
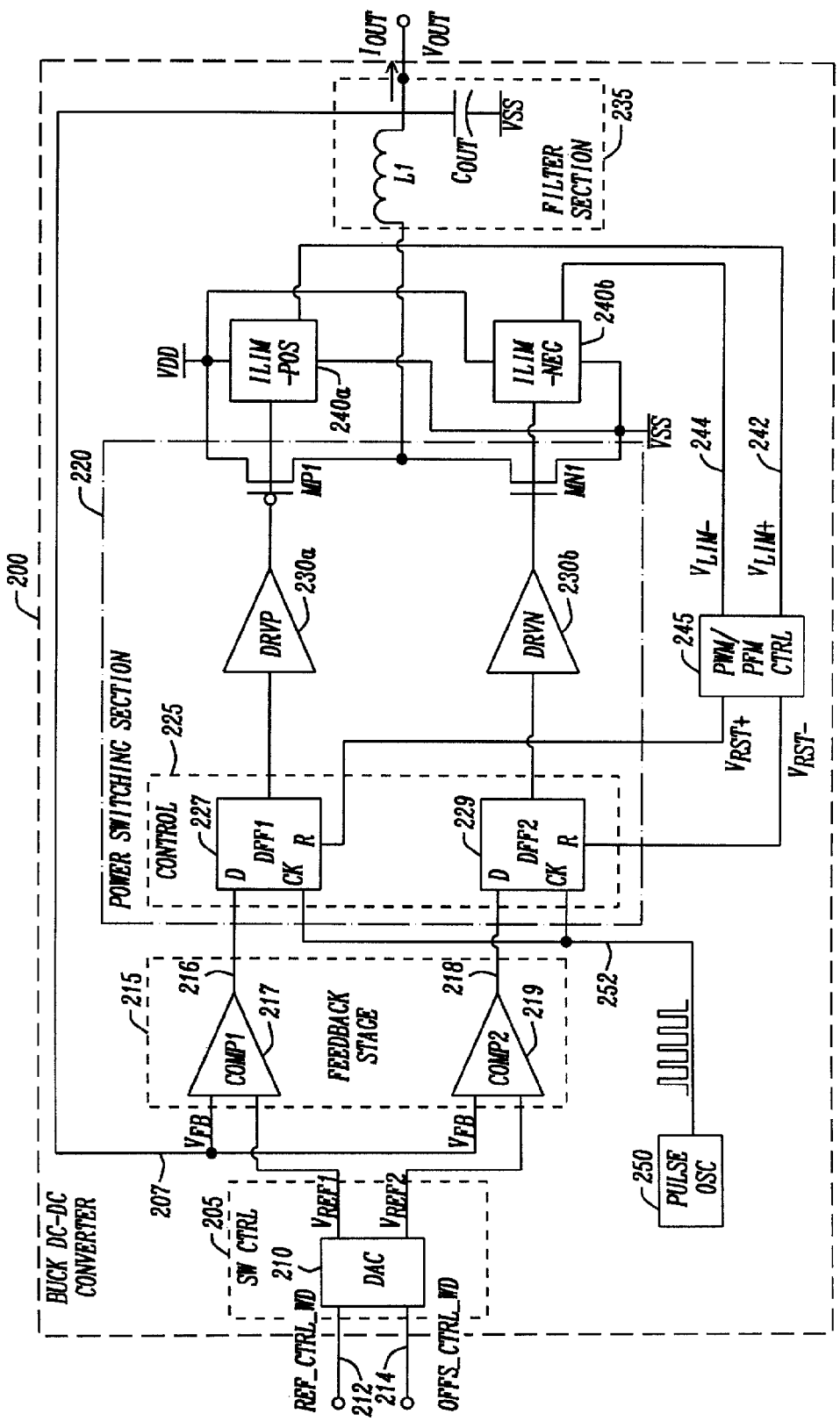
FIG. 2 is a schematic of DC-to-DC converter operating with a pulse width modulation mode and pulse frequency modulation mode embodying the principals of the present disclosure.

FIG. 2 is a schematic of a DC-to-DC converter operating with pulse width modulation mode and pulse frequency modulation mode embodying the principals of the present disclosure. A switch control circuit 205 has a digital-to-analog converter 210 that receives a reference control word 212 and an offset control word 214. The digital-to-analog converter 210 converts the reference control word 112 to the first reference voltage $V_{REF1}$ and converts the offset control word 114 to the second reference voltage $V_{REF2}$. The first reference voltage $V_{REF1}$ and the second reference voltage $V_{REF2}$ are two of the three inputs to the feedback stage 215. The feedback stage 215 has a first comparator 217 that receives the first reference voltage $V_{REF1}$ and a second comparator 219 that receives the second reference voltage $V_{REF2}$. The third 207 of the three inputs to the feedback stage 215 receives the feedback voltage $V_{FB}$ that is compared to the first reference voltage $V_{REF1}$ and the second reference voltage $V_{REF2}$. As described previously, the feedback voltage $V_{FB}$ that is developed from the output voltage $V_{OUT}$ at common connection of the second terminal of the inductor L1 and the first terminal of the output capacitor $C_{OUT}$ of the filter section 235.

The outputs 216 and 218 of the first comparator 217 and a second comparator 219 are the inputs to the switching control circuit 225. The first comparator 217 provides the first control signal 216 is applied to a data input D of a first data flip-flop 227 of the switching control circuit 225. The second comparator 219 provides the second control signal 218 that is applied to a data input D of a second data flip-flop 229 of the switching control circuit 225. An oscillator 250 generates the clock pulse signal 252 that is applied to the clock CK input of the first data flip-flop 227 and the second data flip-flop 229. The output of the first data flip-flop 227 is applied to the input of the positive driver circuit 230a and the output of the second data flip-flop 229 is applied to the input of the negative driver circuit 230b. The output of the first driver circuit 230a is applied to the gate of the PMOS transistor MP1 and the output of the second driver circuit 230b is applied to the gate of the NMOS transistor MN1.

The source of the PMOS transistor MP1 is connected to the power supply voltage source VDD and the source of the NMOS transistor MN1 is connected to the substrate supply voltage source VSS. The substrate supply voltage source VSS is often the ground reference voltage source, but in some applications is a negative voltage level. The commonly connected drains of the PMOS transistor MP1 and the NMOS transistor MN1 are connected to an input terminal of the filter section 235. The input terminal is a first terminal of an inductor L1. The control signals 216 and 218 are applied to the driver circuit 230a and the driver circuit 230b such that the PMOS transistor MP1 is turned on and the NMOS transistor MN1 is turned off, a current from the power supply voltage source VDD from the first terminal of the inductor L1 out the second terminal of the inductor L1 into the first terminal of the output capacitor $C_{OUT}$ and to the substrate supply voltage source VSS. The output voltage $V_{OUT}$ is present at the junction of the second terminal of the inductor L1 and the output capacitor $C_{OUT}$.

A first current limit circuit is designated as a positive current limit circuit 240a that is connected in proximity with the PMOS transistor MP1 and the negative current limit circuit 240b is connected in proximity with the NMOS transistor MN1. The positive current limit circuit 240a and the negative current limit circuit 240b are connected between the power supply voltage source VDD and the substrate supply voltage source VSS. The output of the driver circuit 230a is connected to the positive current limit circuit 240a and the driver circuit 230b is connected to the negative current limit circuit 240b. The output of the positive current limit circuit 240a is a first reference limit signal designated as a positive reference limit voltage 242 and the output of the negative current limit circuit 240b is a second reference limit signal designated as a negative reference limit voltage 244. The positive reference limit voltage 242 and the negative reference limit voltage 244 are the inputs to the pulse width modulation/pulse frequency modulation control circuit 245. The pulse width modulation/pulse frequency modulation control circuit 245 compares the positive reference limit voltage 242 with the voltage $V_{LX}$ developed at the first terminal of an inductor L1 for selectively resetting of the first data flip-flop 227 to control operation of PMOS transistor MP1. The pulse width modulation/pulse frequency modulation control circuit 245 compares the negative reference limit voltage 244 with the voltage $V_{LX}$ developed at the first terminal of an inductor L1 for selectively resetting of the second data flip-flop 229 to control operation of the NMOS transistor MN1.

Figure 3:
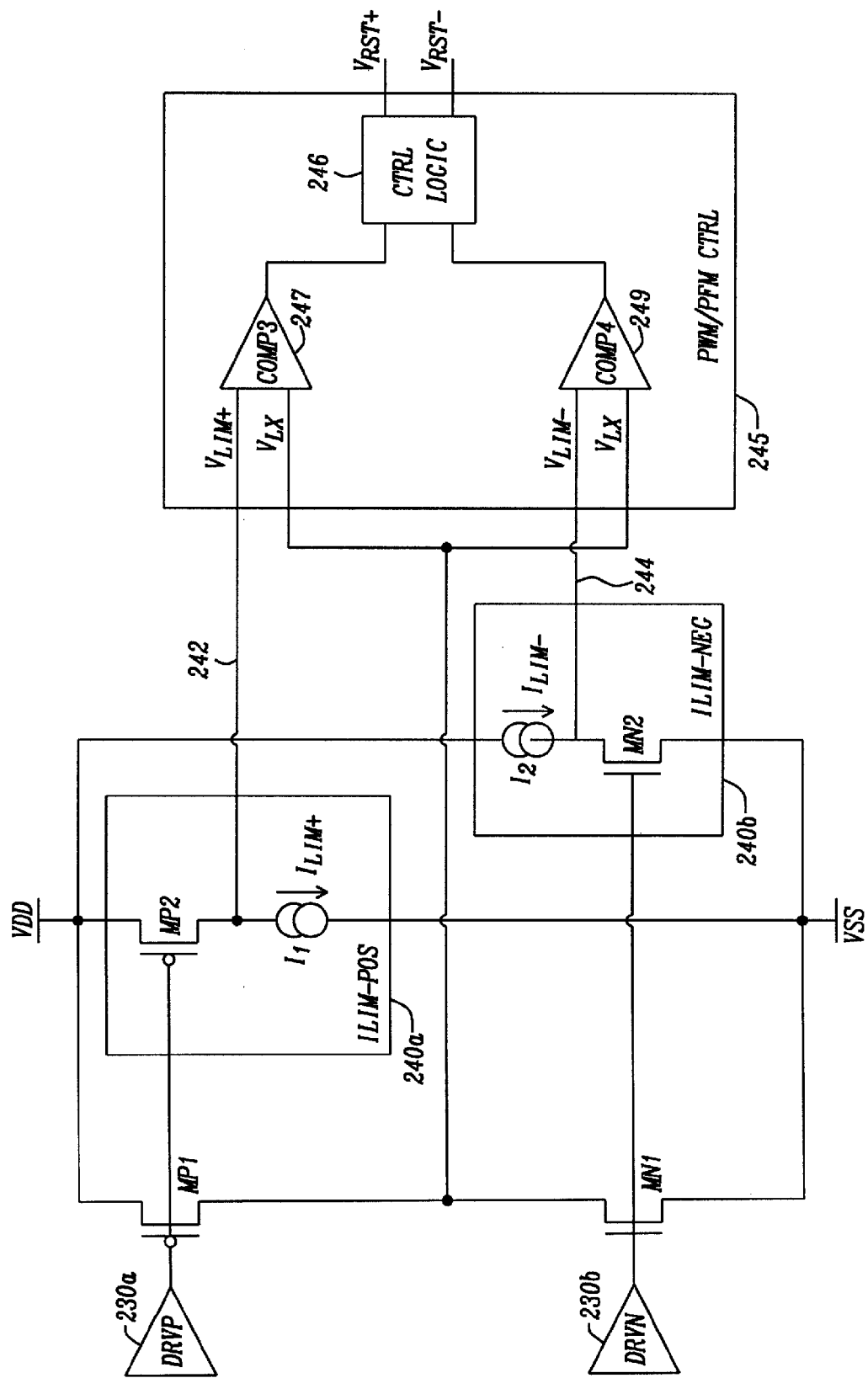
FIG. 3 is a schematic of a positive and negative current limit circuit incorporated within a DC-to-DC converter embodying the principals of the present disclosure.

FIG. 3 is a schematic of the positive current limit circuit 240a and the negative current limit circuit 240b incorporated within a DC-to-DC converter embodying the principals of the present disclosure. The positive current limit circuit 240a has a PMOS transistor MP2 that is a dummy transistor having characteristic that are matched to the geometry and impurity implantations of the PMOS transistor MP1. The PMOS transistor MP2 is used to generate the reference voltage $V_{LIM+}$ for the current limit of the current passing through the PMOS transistor MP1 across the positive reference current source $I_1$. The PMOS transistor MP2 has a gate connected to the output of the positive driver circuit 230a. The source of the PMOS transistor MP2 is connected to the power supply voltage source VDD and the drain of the PMOS transistor MP2 is connected to a first terminal of the positive reference current source $I_1$. The second terminal of the positive reference current source $I_1$ is connected to the substrate supply voltage source VSS.

The negative current limit circuit 240a has an NMOS transistor MN2 that is a dummy transistor characteristic that are matched to the geometry and impurity implantations of the NMOS transistor MN1. The NMOS transistor MN2 is used to generate the reference voltage $V_{LIM-}$ for the current limit of the current passing through the NMOS transistor MN1 across the negative reference current source $I_2$. The first terminal of the negative reference current source $I_2$ is connected to the power supply voltage source VDD. The drain of the NMOS transistor MN2 is connected to a second terminal of the negative reference current source $I_2$ and the source of the NMOS transistor MN2 is connected to the substrate supply voltage source VSS. The NMOS transistor MN2 has a gate connected to the output of the negative driver circuit 230b.

The junction 242 of the PMOS transistor MP2 and the first terminal of the first current source $I_1$ is connected to a first terminal of the third comparator 247 of the pulse width modulation/pulse frequency modulation control circuit 245. Similarly, the junction 244 of the NMOS transistor MN2 and the second terminal of the second current source $I_2$ is connected to a first terminal of the fourth comparator 249 of the pulse width modulation/pulse frequency modulation control circuit 245. The second terminals of the third comparator 247 and fourth comparator 249 are connected to the connection of the drains of the PMOS transistor MP1 and the NMOS transistor MN1 with the first terminal of the inductor L1 of FIG. 2. The reference voltage $V_{LIM+}$ and reference voltage $V_{LIM-}$ are compared with the voltage $V_{LX}$ developed at the connection of the drains of the PMOS transistor MP1 and the NMOS transistor MN1 with the first terminal of the inductor L1 during the corresponding part of the duty cycle to determine when the output current is too high. The results of the comparison of the reference voltage $V_{LIM+}$ and reference voltage $V_{LIM-}$ with the voltage $V_{LX}$ are applied to the control logic circuit 246 to generate the reset signals $V_{RST+}$ and $V_{RST-}$ that are transferred respectively to the reset terminals R of the first data flip-flop 227 and the second data flip-flop 229.

As noted above, the output of the first driver circuit 230a controls the gate of the PMOS transistor MP1 and the output of the second driver circuit 230b controls the gate of the NMOS transistor MN1. With the input of the driver circuit 230a being controlled by the output of the first data flip-flop 227 and the input of the driver circuit 230b being controlled by the second data flip-flop 229. If the first control signal 216 or the second control signal 218 as applied to the data inputs of the first data flip-flop 227 and the input of the second data flip-flop 229 are active at the receipt of the triggering edge of the clock pulse signal 252, the output of the first data flip-flop 227 and the output of the second data flip-flop 229 turn on the corresponding PMOS transistor MP1 or NMOS transistor MN1. The activated PMOS transistor MP1 or NMOS transistor MN1 is then turned off by the corresponding reset signals $V_{RST+}$ and $V_{RST-}$.

It should be noted that the control logic circuit 246 has circuitry that will permit the reset signals $V_{RST+}$ and $V_{RST-}$ to turn on the either the activated PMOS transistor MP1 or NMOS transistor MN1, as required. In some embodiments, the second comparator 219 is offset by approximately 10 mV as determined by the second reference voltage $V_{ref2}$ to allow a small range of output voltages for which the PMOS transistor MP1 or NMOS transistor are not switched to provide a saving in power for very low loads.

Figure 4:
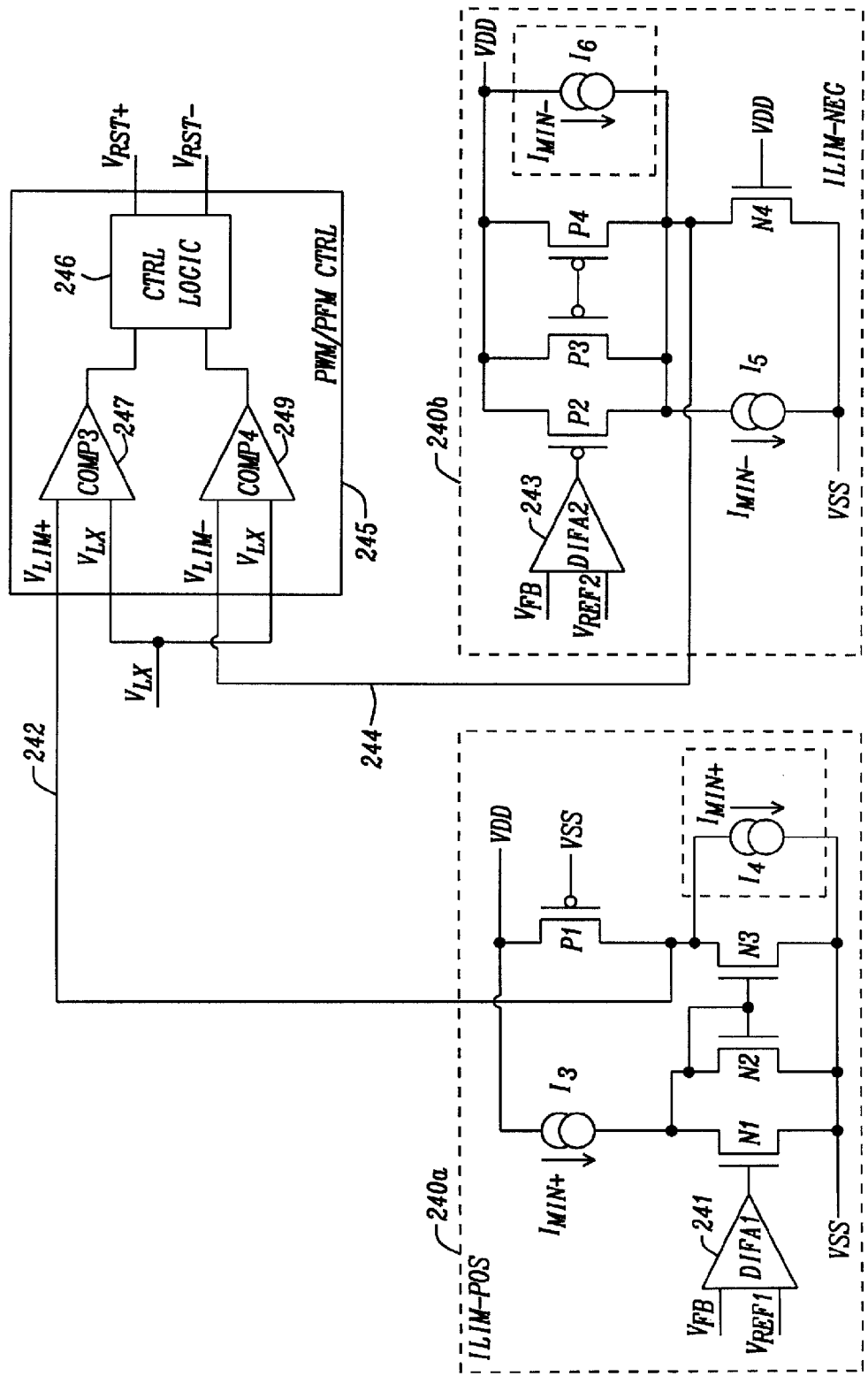
FIG. 4 is a schematic of an embodiment of a positive dynamic current limit circuit and a negative dynamic current limit circuit incorporated within a DC-to-DC converter of FIG. 2.

FIG. 4 is a schematic of an embodiment of a positive dynamic current limit circuit 240a and a negative dynamic current limit circuit 240b incorporated within a DC-to-DC converter of FIG. 2. In the embodiment as shown, a first differential amplifier 241 receives the first reference voltage $V_{REF1}$ and the feedback voltage $V_{FB}$ to be compared. The output of the differential amplifier 241 is connected to a gate of a first NMOS switching transistor N1. The drain of the first NMOS switching transistor N1 is connected to a first terminal of a third reference current source $I_3$ that sources a maximum positive reference current $I_{MAX+}$. A second terminal of the third current source $I_3$ is connected to the power supply voltage source VDD.

The NMOS transistors N2 and N3 form a first limit current mirror designated as a positive limit current mirror. The NMOS transistor N2 is a diode-connected transistor that forms the reference leg of the positive limit current mirror and has its gate and drain commonly connected to the first terminal of the third current source $I_3$. The source of the NMOS transistor N2 is connected to the substrate supply voltage source VSS. The NMOS transistor N3 forms the mirror leg of the positive limit current source and has its gate connected to the commonly connected gate and drain of the NMOS transistor N2 of the reference leg. The drain of the NMOS transistor N3 is connected to the drain of a dummy PMOS transistor P1. The source of the dummy PMOS transistor P1 is connected to the power supply voltage source VDD and the gate of the dummy PMOS transistor P1 is connected to the substrate supply voltage source VSS. The dummy PMOS transistor P1 is matched to the geometry and impurity implantations of the PMOS transistor MP1 of FIG. 2.

The first differential amplifier 241 compares the first reference voltage $V_{REF1}$ and the feedback voltage $V_{FB}$ voltage. The voltage level of the output of the differential amplifier 241 causes the NMOS transistor N1 to steal current from the third current source $I_3$ that sources a maximum positive reference current $I_{MAX+}$. The maximum positive reference current $I_{MAX+}$ sets the maximum current limit possible. The current mirror formed by the NMOS transistors N2 and N3 then mirrors the remaining current through the dummy PMOS transistor P1. In various embodiments, a fourth reference current source $I_4$ provides a fixed minimum current that may optionally be necessary. The output reference voltage $V_{LIM+}$ is applied to the input of the pulse width modulation/pulse frequency modulation control circuit 245.

A second differential amplifier 242 receives the second reference voltage $V_{REF2}$ and the feedback voltage $V_{FB}$ to be compared. The output of the differential amplifier 243 is connected to a gate of a second PMOS switching transistor P2. The drain of the second PMOS switching transistor P2 is connected to a first terminal of a fifth current source $I_5$ that sources a maximum negative reference current $I_{MAX-}$. A second terminal of the fifth reference current source $I_5$ is connected to the substrate supply voltage source VSS.

The PMOS transistors P3 and P4 form a second limit current mirror designated as a negative limit current mirror. The PMOS transistor P3 is a diode-connected transistor that forms the reference leg of the positive limit current mirror and has its gate and drain commonly connected to the first terminal of the fifth current source $I_5$. The source of the PMOS transistor P3 is connected to the power supply voltage source VDD. The PMOS transistor P4 forms the mirror leg of the negative limit current source and has its gate connected to the commonly connected gate and drain of the PMOS transistor P3 of the reference leg. The drain of the PMOS transistor P4 is connected to the drain of a dummy NMOS transistor N4. The source of the dummy NMOS transistor N4 is connected to the substrate supply voltage source VSS and the gate of the dummy PMOS transistor P1 is connected to the power supply voltage source VDD. The dummy NMOS transistor N4 is matched to the geometry and impurity implantations of the NMOS transistor MN1 of FIG. 2.

The second differential amplifier 243 compares the second reference voltage $V_{REF2}$ and the feedback voltage $V_{FB}$ voltage. The voltage level of the output of the second differential amplifier 243 causes the PMOS transistor P2 to steal current from the fifth current source $I_5$ that sinks a maximum negative reference current $I_{MAX-}$. The maximum negative reference current $I_{MAX-}$ sets the maximum negative current limit possible. The current mirror formed by the PMOS transistors P3 and P4 then mirrors the remaining current through the dummy NMOS transistor N4. In various embodiments, a sixth reference current source $I_6$ provides a fixed minimum current that may optionally be necessary. The output reference voltage $V_{LIM-}$ is applied to the input of the pulse width modulation/pulse frequency modulation control circuit 245.

The reference voltage $V_{LIM+}$ and reference voltage $V_{LIM-}$ are compared in the comparators 247 and 249 with the voltage $V_{LX}$ developed at the connection of the drains of the PMOS transistor MP1 and the NMOS transistor MN1 with the first terminal of the inductor L1 during the corresponding part of the duty cycle to determine when the output current is too high. The results of the comparison of the reference voltage $V_{LIM+}$ and reference voltage $V_{LIM-}$ with the voltage $V_{LX}$ are applied to the control logic circuit 246 to generate the reset signals $V_{RST+}$ and $V_{RST-}$ that are transferred respectively to the reset terminals R of the first data flip-flop 227 and the second data flip-flop 229.

As noted above, the output of the first driver circuit 230a controls the gate of the PMOS transistor MP1 and the output of the second driver circuit 230b controls the gate of the NMOS transistor MN1. The input of the driver circuit 230a is controlled by the output of the first data flip-flop 227 and the input of the driver circuit 230b is controlled by the second data flip-flop 229. If the first control signal 216 or the second control signal 218 as applied to the data inputs of the first data flip-flop 227 and the input of the second data flip-flop 229 are active at the receipt of the triggering edge of the clock pulse signal 252, the output of the first data flip-flop 227 and the output of the second data flip-flop 229 turn on the corresponding PMOS transistor MP1 or NMOS transistor MN1. The activated PMOS transistor MP1 or NMOS transistor MN1 is then turned off by the corresponding reset signals $V_{RST+}$ and $V_{RST-}$.

As noted above, the control logic circuit 246 has circuitry that will permit the reset signals $V_{RST+}$ and $V_{RST-}$ to turn on the either the PMOS transistor MP1 or the NMOS transistor MN1, as required. In some embodiments, the second comparator 219 is offset by approximately 10 mV as determined by the second reference voltage $V_{ref2}$ to allow a small range of output voltages for which the PMOS transistor MP1 or NMOS transistor MN1 are not switched to provide a saving in power for very low loads.

Figure 5:
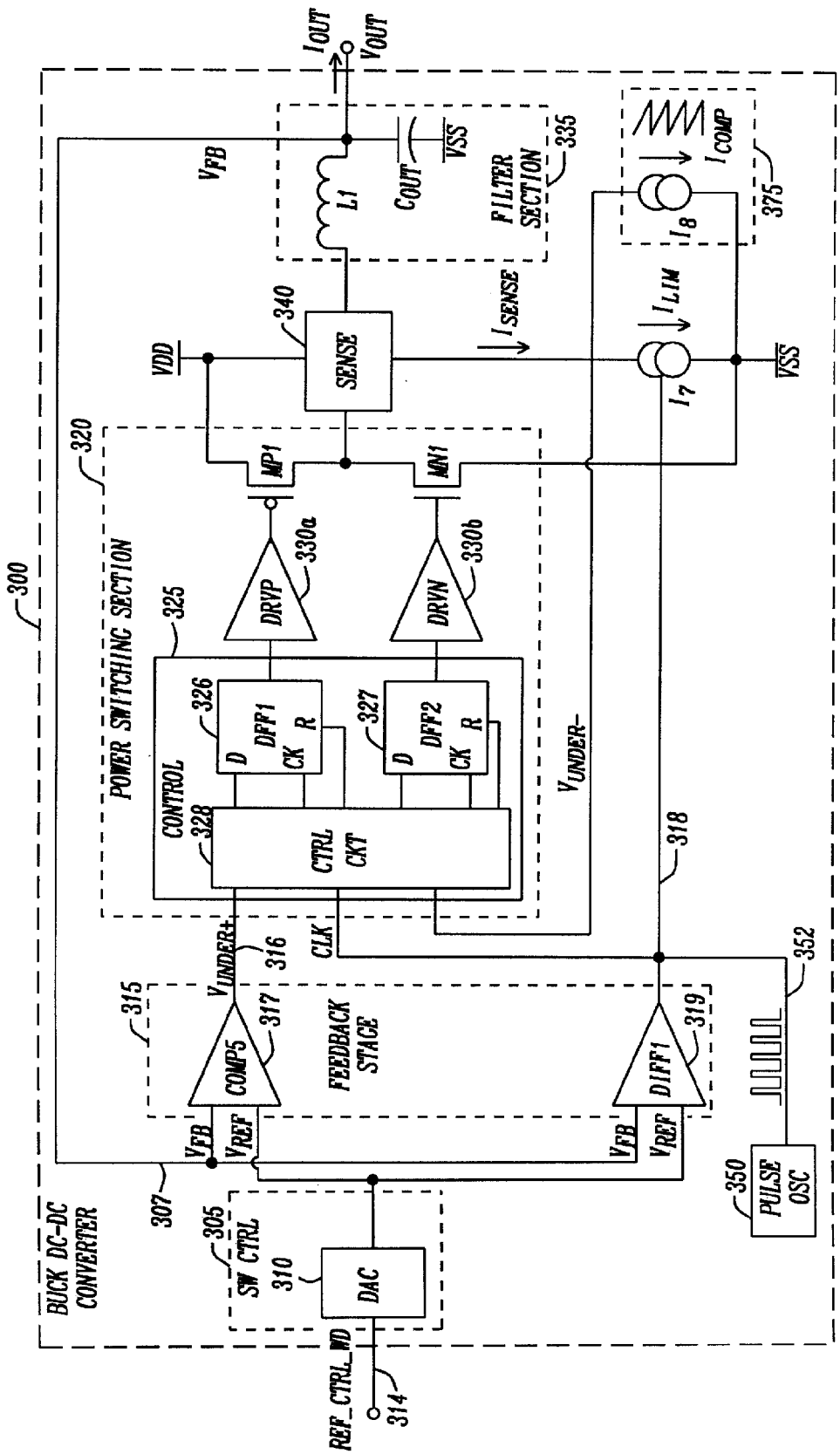
FIG. 5 is a schematic of a DC-to-DC converter with a dynamic sleep mode embodying the principals of the present disclosure.

FIG. 5 is a schematic of a DC-to-DC converter with a dynamic sleep mode embodying the principals of the present disclosure. In various embodiments, the switch control circuit 305 has a digital-to-analog converter 310 that receives a reference control word 314. The digital-to-analog converter 310 converts the reference control word 314 to the reference voltage $V_{REF}$. The reference voltage $V_{REF}$ is one of the two inputs to the feedback stage 315. The feedback stage 315 has a first comparator 317 and a differential amplifier 319 that receive the reference voltage $V_{REF}$. The second input 307 of the feedback stage 315 receives the feedback voltage $V_{FB}$ that is compared to the reference voltage $V_{REF}$. As described previously, the feedback voltage $V_{FB}$ is developed from the output voltage $V_{OUT}$ at common connection of the second terminal of the inductor L1 and the first terminal of the output capacitor $C_{OUT}$ of the filter section 235.

The output 316 of the first comparator 317 is the first input to the switching control circuit 325. The first comparator 317 provides the positive control signal $V_{UNDER+}$ that is applied to a data input of a first data flip-flop 326 of the switching control circuit 325. The output 318 of the differential amplifier 319 provides a current control signal that is applied to a differential current source $I_7$. The differential current source $I_7$ develops a reference limit current $I_{LIM}$. The sense circuit 340 provides a load for the differential current source $I_7$ and thus the current limit flag signal $V_{ILIMFLG}$.

The current control signal from the output 318 of the differential amplifier 319 adjusts the differential current source $I_7$ such that the voltage levels are such that the data input of the second data flip-flop 328 of the switching control circuit 325 are at the correct logic levels for controlling the switching of the NMOS transistor MN1.

An oscillator 350 generates the clock pulse signal 352 that is applied to the clock CK input of the first data flip-flop 326 and the second data flip-flop 328. The output of the first data flip-flop 326 is applied to the input of the positive driver circuit 330a and the output of the second data flip-flop 329 is applied to the input of the negative driver circuit 330b. The output of the first driver circuit 330a is applied to the gate of the PMOS transistor MP1 and the output of the second driver circuit 330b is applied to the gate of the NMOS transistor MN1.

The source of the PMOS transistor MP1 is connected to the power supply voltage source VDD and the source of the NMOS transistor MN1 is connected to the substrate supply voltage source VSS. The substrate supply voltage source VSS is often the ground reference voltage source, but in some applications is a negative voltage level. The commonly connected drains of the PMOS transistor MP1 and the NMOS transistor MN1 are connected to an input terminal of the filter section 235. The input terminal is a first terminal of an inductor L1. The data output of the first data flip-flop 326 is applied to the driver circuit 330a and the data output of the second data flip-flop 327 is applied to the driver circuit 330b. When states of the first flip-flop 326 and the second flip-flop 327 are such that the PMOS transistor MP1 is turned on and the NMOS transistor MN1 is turned off, a current from the power supply voltage source VDD from the first terminal of the inductor L1 out the second terminal of the inductor L1 into the first terminal of the output capacitor $C_{OUT}$ and to the substrate supply voltage source VSS. The output voltage $V_{OUT}$ is present at the junction of the second terminal of the inductor L1 and the output capacitor $C_{OUT}$.

In the dynamic sleep mode, the reference limit current $I_{LIM}$ from the differential current source $I_7$ is allowed to vary and thus enable the DC-to-DC converter to support very high loads. The sense circuit 340 senses the output current $I_{OUT}$ when the PMOS transistor MP1 is turned on. The sense circuit 340 generates a sense current $I_{SENSE}$ produces a current proportional to the current in the PMOS transistor MP1. The sense current $I_{SENSE}$ is compared to the reference limit current $I_{LIM}$. When the sense current $I_{SENSE}$ from sense circuit 340 is greater than the reference limit current $I_{LIM}$ then the voltage on current limit flag signal $V_{ILIMFLG}$ assumes a first logic level (1). When the sense current $I_{SENSE}$ from sense circuit 340 is less than the reference limit current $I_{LIM}$ then the voltage on current limit flag signal $V_{ILIMFLG}$ assumes a second logic level (0).

When the sense current $I_{SENSE}$ is greater than the reference limit current $I_{LIM}$, the current limit flag signal $V_{ILIMFLG}$ indicates that current limit is achieved and the control circuit 328 generates the data applied to the input of the first flip-flop 326 that will force the first driver circuit 330a to turnoff the PMOS transistor MP1. The reference limit current $I_{LIM}$ is modulated by the output voltage of the differential amplifier 319 as a result of the comparison of the feedback voltage $V_{FB}$ with the reference voltage $V_{REF}$. As the feedback voltage $V_{FB}$ falls below the reference voltage $V_{REF}$, the reference current is increased, and so the current limit value is also increased.

Figure 6:
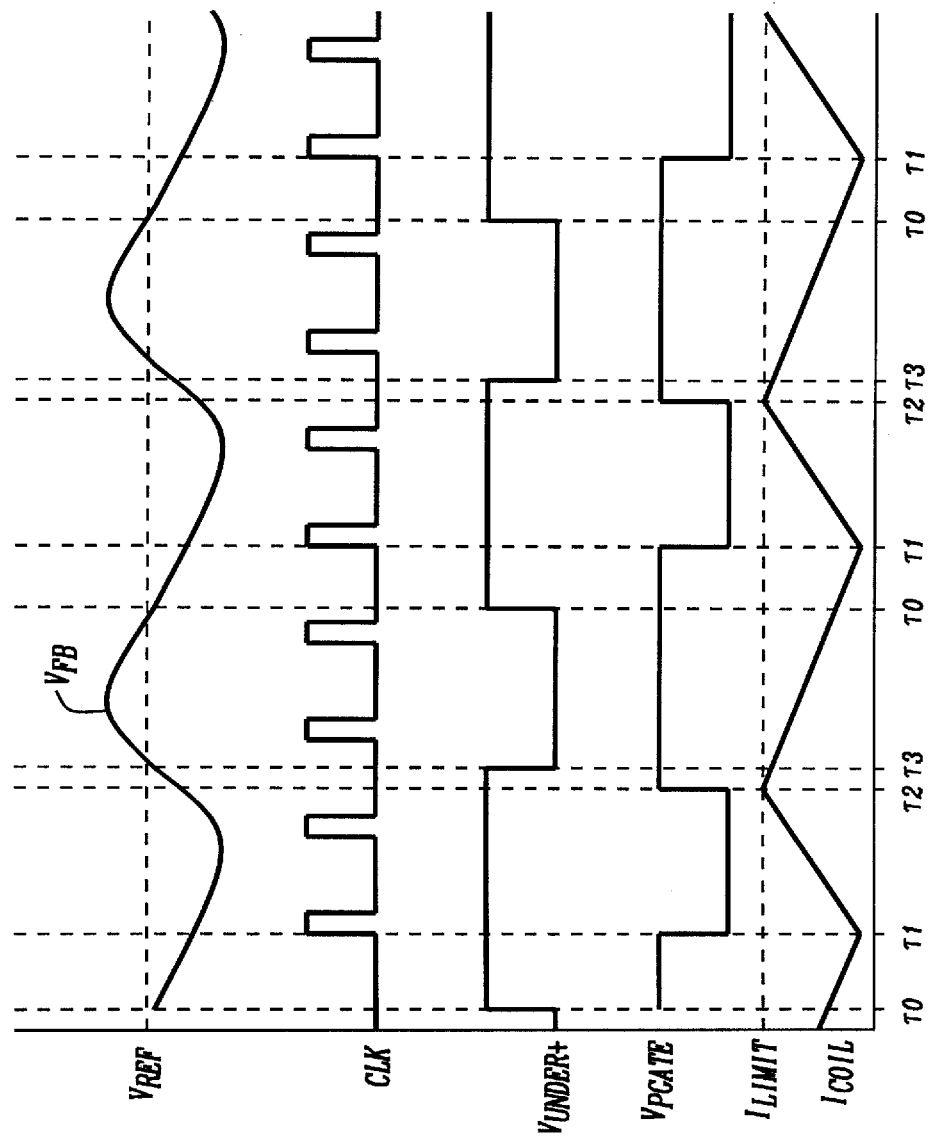
FIG. 6 is a plot of the waveforms of the signals the DC-to-DC converter of FIG. 5 with a dynamic sleep mode with a continuous loading.

FIG. 6 is a plot of the waveforms of the signals the DC-to-DC converter in dynamic sleep mode operation of FIG. 5. When the feedback voltage $V_{FB}$ falls below the reference voltage $V_{REF}$ from digital-to-analog converter 310, the output of the first comparator 317 rises from the second level (0) to the first level (1) at the time $\tau_0$ to activate the positive control signal $V_{UNDER+}$. The first level (1) is applied through the control circuit 328 to the first data flip-flop 326. The data present at the data input D of the first data flip-flop 326 is not transferred to the output of the first data flip-flop 326 until the rising edge of the clock CLK at the time $\tau_1$ at which time the gate of the PMOS transistor MP1 is brought to the first level (0) to turn on the PMOS transistor MP1 such that current $I_{COIL}$ passes to the first terminal of the inductor L1.

The current $I_{COIL}$ through the inductor L1 rises from the time $\tau_1$ to the time $\tau_2$ when the current $I_{COIL}$ reaches the magnitude of the reference limit current $I_{LIM}$. The voltage of the current limit flag signal $V_{ILIMFLG}$, developed at the top of the differential current source $I_7$ is applied to the control circuit 328 and the control circuit 328 sets the data at the data inputs D of the first and second data flip-flops 326 and 327 such that the PMOS transistor MP1 and the NMOS transistor MN1 are turned off. With the PMOS transistor MP1 and the NMOS transistor MN1 are turned off, the current $I_{COIL}$ falls toward zero and the DC-to-DC converter operates in the discontinuous mode. When the current $I_{COIL}$ falls sufficiently less than the reference limit current $I_{LIM}$, the voltage of the current limit flag signal $I_{LIMFLG}$ is deactivated to essentially the first level (0) at the time $\tau_1$.

In some embodiments as shown in FIG. 5, the limit current $I_{LIM}$ is controlled by the sum of two reference currents. The first reference current is provided by the adjustable differential current source $I_7$, as described above. The second reference current is fixed ramp current source $I_8$. The reference limit current $I_{LIM}$ of the adjustable differential current source $I_7$ and the compensation current $I_{COMP}$ of the fixed ramp current source $I_8$ are additively combined to provide a degree of compensation to prevent sub-harmonic oscillation. The ramp waveform of the compensation current $I_{COMP}$ should start at a high value and have a negative slope. In some embodiments, the compensation current $I_{COMP}$ has a negative value thus subtracting current from differential current source $I_7$.

Figure 7:
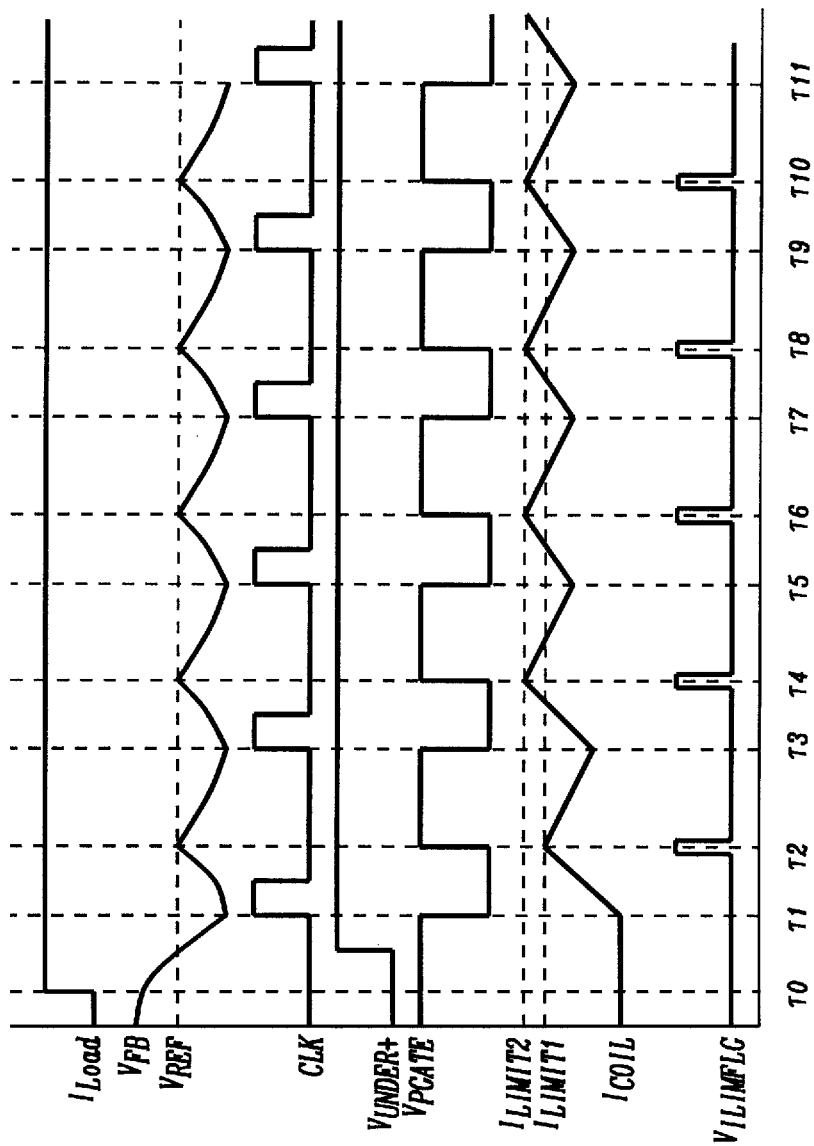
FIG. 7 is a plot of the waveforms of the signals the DC-to-DC converter of FIG. 5 in dynamic sleep mode operation illustrating a change in load current.

FIG. 7 is a plot of the waveforms of the signals the DC-to-DC converter of FIG. 5 in dynamic sleep mode operation illustrating a change in output current $I_{OUT}$ to the external load circuit. When the output current $I_{OUT}$ increases at the time $\tau_0$, the feedback voltage $V_{FB}$ starts to fall until it is below the below the reference voltage $V_{REF}$ from digital-to-analog converter 310, the output of the first comparator 317 rises at the time $\tau_1$ from the second logic level (0) to the first logic level (1) to activate the positive control signal $V_{UNDER+}$. The first logic level (1) is applied through the control circuit 328 to the first data flip-flop 326. The data present at the data input D of the first data flip-flop 326 is not transferred to the output of the first data flip-flop 326 until the rising edge of the clock CLK at the time $\tau_2$ at which time the gate of the PMOS transistor MP1 is brought to the first level (0) to turn on the PMOS transistor MP1 such that current $I_{COIL}$ passes to the first terminal of the inductor L1.

The current $I_{COIL}$ through the inductor L1 rises from the time $\tau_2$ to the time $\tau_3$ when the coil current $I_{COIL}$ reaches the magnitude of the reference limit current $I_{LIM1}$. The voltage of the current limit flag signal $V_{ILIMFLG}$, developed at the top of the differential current source $I_7$ is applied at the time $\tau_3$ to the control circuit 328 and the control circuit 328 sets the data at the data inputs D of the first and second data flip-flops 326 and 327 such that the PMOS transistor MP1 and the NMOS transistor MN1 are turned off. With the PMOS transistor MP1 and the NMOS transistor MN1 are turned off, the current $I_{COIL}$ falls toward zero from the time $\tau_3$ to the time $\tau_4$ and the DC-to-DC converter operates in the discontinuous mode. When the current $I_{COIL}$ falls sufficiently less than the first reference limit current $I_{LIM1}$, the voltage of the current limit flag signal $V_{ILIMFLG}$ is deactivated to essentially the first level (0) shortly after the time $\tau_3$.

The feedback voltage $V_{FB}$ has also decreased from the time $\tau_3$ to the time $\tau_4$ and remains less than the reference voltage $V_{REF}$ such that at the time $\tau_4$, the gate of the PMOS transistor MP1 is activated with the rising edge of the clock pulse CLK. The coil current $I_{COIL}$ begins to rise between the time $\tau_4$ and the time $\tau_5$. In the time between the time $\tau_4$ and the time $\tau_5$, the first reference limit current $I_{LIM1}$ from the differential current source $I_7$ is adjusted by the differential voltage $\Delta V$ from the differential amplifier 319 to a second reference limit current $I_{LIM2}$. When the coil current $I_{COIL}$ reaches the level of the second reference limit current $I_{LIM2}$, the current limit flag signal $V_{ILIMFLG}$ is activated shortly before the time $\tau_5$. The gate of the PMOS transistor MP1 is set to the first logic level (1) and the PMOS transistor MP1 is turned off at the time at the time $\tau_5$. When the current $I_{COIL}$ falls sufficiently less than the second reference limit current $I_{LIM2}$, the voltage of the current limit flag signal $V_{ILIMFLG}$ is deactivated to essentially the second level (0) shortly after the time $\tau_5$. The coil current $I_{COIL}$ falls between the time $\tau_5$ and the time $\tau_6$ such that the feedback voltage $V_{FB}$ is decreasing from the time $\tau_5$ to the time $\tau_6$ and remains less than the reference voltage $V_{REF}$ such that at the time $\tau_6$ gate of the PMOS transistor MP1 is activated with the rising edge of the clock pulse CLK.

The cyclic operation from the time $\tau_4$ to the time $\tau_{12}$ is equivalent to that described between the time $\tau_4$ and the time $\tau_6$. This process continues until the output current $I_{OUT}$ decreases the normal dynamic sleep mode or the system commands the DC-to-DC converter to resume the normal continuous operation mode. Varying between the first reference limit current $I_{LIM1}$ and the second reference limit current $I_{LIM2}$ controls an interval and duration of the time at which the switching section 320 is switched to permit the DC-to-DC converter to manage large changes in an output current load $I_{OUT}$, while operating in the discontinuous operation mode.

Figure 8:
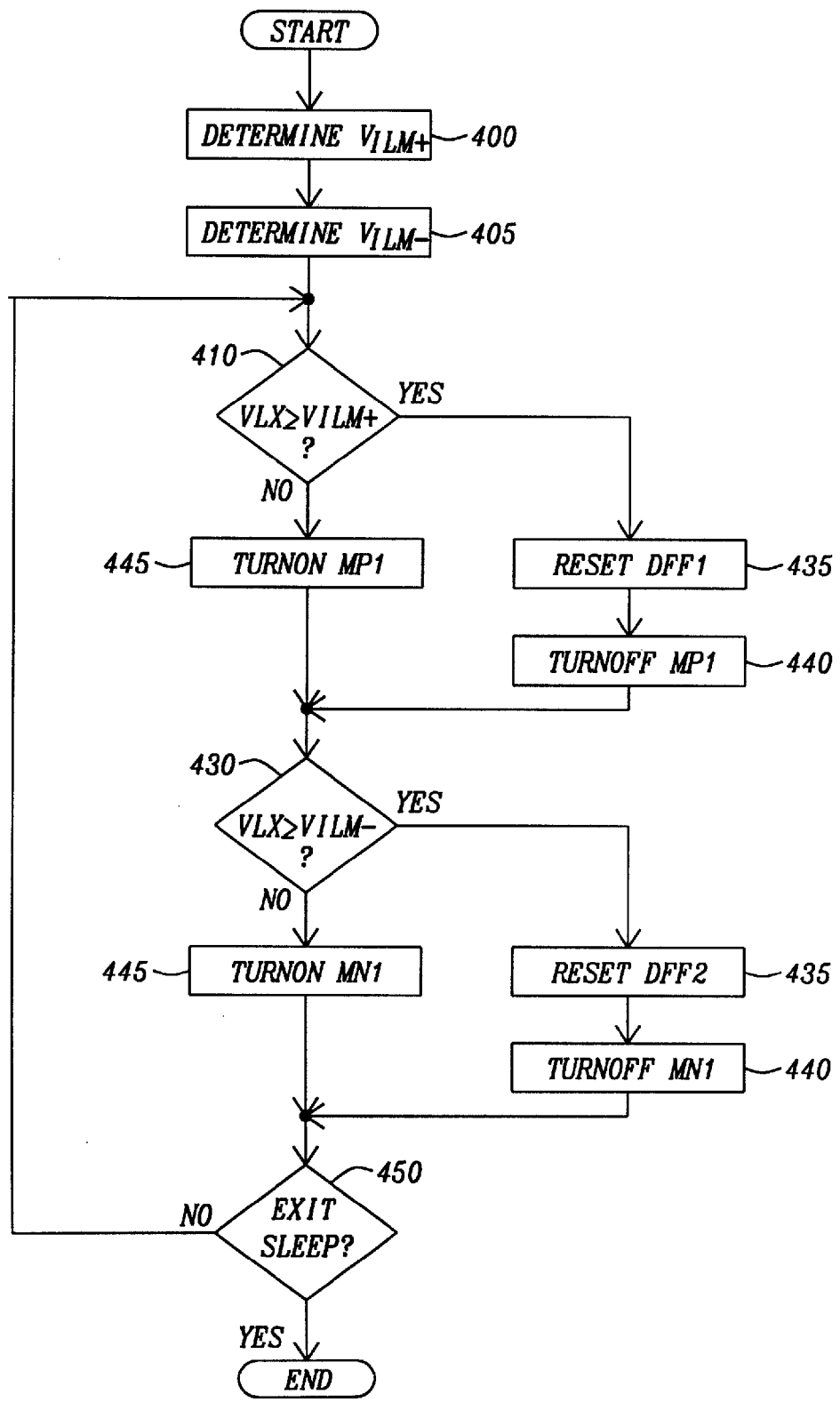
FIGS. 8 and 9 are flowcharts of a method for providing hysteretic mode control within a DC-to-DC converter embodying the principals of the present disclosure.

FIG. 8 is flowchart of a method for providing hysteretic mode control within a DC-to-DC converter 200 of FIG. 2. The most positive voltage limit $V_{ILM+}$ representing a maximum current $I_{LIM+}$ to pass through the inductor L1 of the low pass filter section 235 is determined (Box 400). Similarly, the most negative voltage limit $V_{ILM-}$ representing a minimum current $I_{LIM-}$ to pass through the inductor L1 of the low pass filter section 235 is determined (Box 405). The voltage $V_{LX}$ present at the junction of the drains of the PMOS transistor MP1 and the NMOS transistor MN1 with the first terminal of the inductor L1 is compared (Box 405) with the positive voltage limit $V_{ILM+}$. If the voltage $V_{LX}$ is greater than or equal to the positive voltage limit $V_{ILM+}$, the first data flip-flop 227 is reset (Box 405) and the PMOS transistor MP1 is turned off. The voltage $V_{LX}$ is compared (Box 430) with the negative voltage limit $V_{ILM-}$. If the voltage $V_{LX}$ is not greater than or equal to the negative voltage limit $V_{ILM-}$, the NMOS transistor MN1 is turned on (Box 445). The operational mode of the DC-to-DC converter 200 is queried (Box 450) to determine if the dynamic sleep mode is to be terminated and the normal continuous operational mode resumed.

If the dynamic sleep mode is to be continued, the process then returns to the comparing (Box 405) of the voltage $V_{LX}$ with the positive voltage limit $V_{ILM+}$. If, this instance, the voltage $V_{LX}$ is not greater than or equal to the positive voltage limit $V_{ILM+}$, the PMOS transistor MP1 is turned on. The voltage $V_{LX}$ is compared (Box 430) with the negative voltage limit $V_{ILM-}$. If the voltage $V_{LX}$ is greater than or equal to the negative voltage limit $V_{ILM-}$, the data flip-flop 229 is reset (Box 435) and the NMOS transistor MN1 is turned off (Box 440). The operational mode of the DC-to-DC converter 200 is again queried (Box 450) to determine if the dynamic sleep mode is to be terminated and the normal continuous operational mode resumed. If the normal continuous operational mode is to be resumed the process is ended. If the dynamic sleep mode is to be continued, the process as above described, continues.

Figure 9:
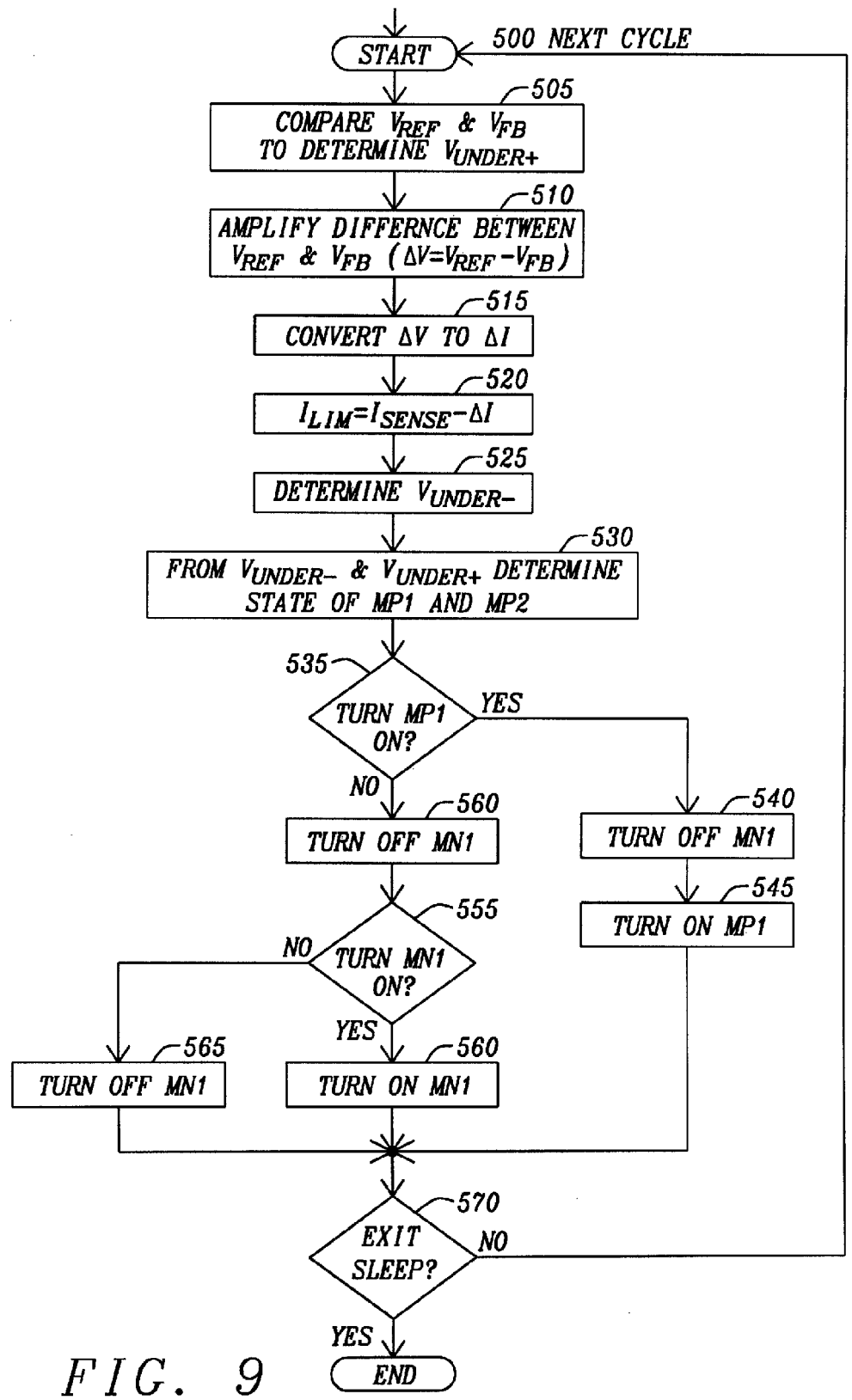
Figure 4:
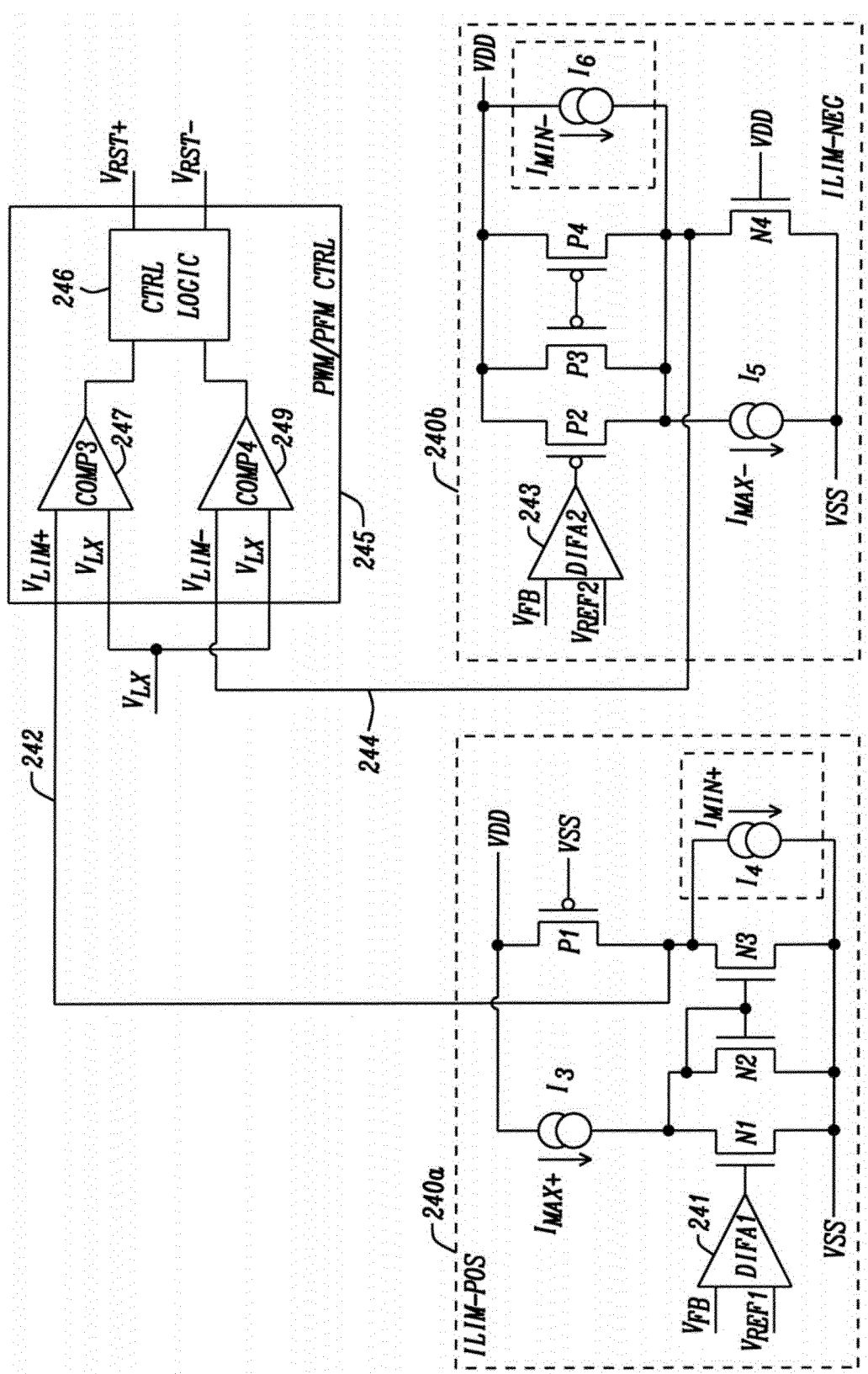
Figure 5:
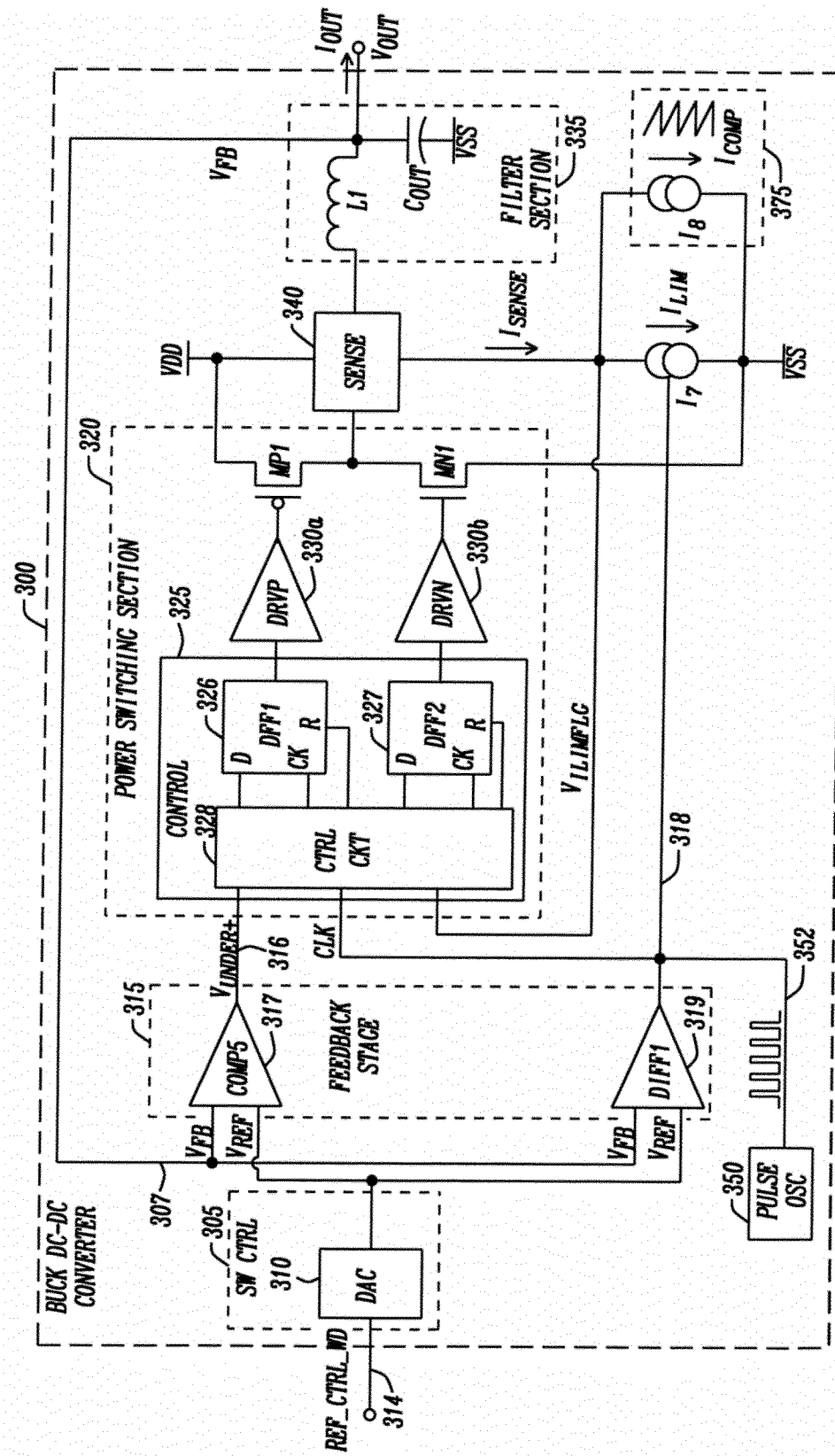

FIG. 9 is flowchart of a method for providing hysteretic mode control within a DC-to-DC converter 300 of FIG. 5. When the DC-to-DC converter 300 is set to begin (Box 500) the dynamic sleep mode, the voltage reference $V_{ref}$ and the feedback voltage $V_{FB}$ are compared (Box 505) to determine the positive control signal $V_{UNDER+}$. The differential $\Delta V$ between the voltage reference $V_{ref}$ and the feedback voltage $V_{FB}$ is amplified (Box 510) and then converted (Box 515) to a differential current $\Delta V$. The limiting current $I_{LIM}$ is set (Box 520) as the subtractive combination of the sense current $I_{SENSE}$ and the differential current $\Delta V$. The limiting current $I_{LIM}$ determines (Box 525) a current limit flag signal $V_{ILIMFLG}$.

From the positive control signal $V_{UNDER+}$ and the current limit flag signal $V_{ILIMFLG}$, the state of the voltage to be applied to the gate of the PMOS transistor MP1 and the gate of the NMOS transistor MN1 are determined (Box 530). The states of the voltage applied to the gate of the PMOS transistor MP1 and the gate of the NMOS transistor MN1 may be such that either the PMOS transistor MP1 is turned on and the NMOS transistor MN1 is turned off, or the PMOS transistor MP1 is turned off and the NMOS transistor MN1 is turned on, or the PMOS transistor MP1 is turned off and the NMOS transistor MN1 is turned off. The state of the gate of the PMOS transistor MP1 is examined (Box 535) to determine if the PMOS transistor MP1 is turned on. The NMOS transistor MN1 is turned off (Box 540) and the PMOS transistor MP1 is turned on (Box 545), if the state of the gate of the PMOS transistor MP1 indicates the PMOS transistor MP1 is to be turned on. If the state of the gate of the PMOS transistor MP1 indicates the PMOS transistor MP1 is to be turned off, the PMOS transistor MP1 is turned off (Box 545) and the state of the gate of the NMOS transistor MN1 is examined (Box 555) to determine if the NMOS transistor MN1 is turned on. The NMOS transistor MN1 is turned on (Box 560), if the state of the gate of the NMOS transistor MN1 indicates the NMOS transistor MN1 is to be turned on. If the state of the gate of the NMOS transistor MN1 indicates the NMOS transistor MN1 is to be turned off, the NMOS transistor MN1 is turned off (Box 565). If the PMOS transistor MP1 is turned on (Box 545) or the NMOS transistor MN1 is turned on (Box 560), or the PMOS transistor MP1 is turned off (Box 550) and NMOS transistor MN1 is turned off (Box 565), the sleep mode is examined (Box 570) to determine if the continuous mode is to be resumed. If the sleep mode is to be continue, the next cycle is started 500 and the process as described above is repeated. If the sleep mode is to be discontinued, the continuous mode is resumed and the dynamic sleep mode is ended.

While this disclosure has been particularly shown and described with reference to the preferred embodiments thereof, it will be understood by those skilled in the art that various changes in form and details may be made without departing from the spirit and scope of the disclosure.

What is claimed is:

1. A hysteretic mode control circuit within a DC-to-DC converter that is configured for operating in a continuous mode or a discontinuous mode, the hysteretic mode control circuit comprising:
    a first current limit circuit configured for determining a first reference limit signal that is used for controlling activation of a first switch of a switching section of the DC-to-DC converter for transferring current to a load device placed at an output of the DC-to-DC converter, wherein the first current limit circuit comprises:
        a first dynamic current limit circuit comprising:
            a first reference current source configured for providing a first maximum reference current;
            a first limit current mirror connected such that a reference leg of the first limit current mirror receives the first maximum reference current and configured such that a mirror leg of the first limit current mirror is connected to provide the first reference limit signal for an output of the first current limit circuit to determine the switching interval and duration of the first switch to provide a current to the filter section of the DC-to-DC converter;
        a comparator connected to receive the first reference limit signal and a feedback signal from the output of the DC-to-DC converter and configured for determining if the feedback signal is greater than or less than the first reference limit signal to generate an output signal; and
        a comparison switching device connected to receive the output signal of the comparator that is activated or deactivated to divert a current from the reference leg of the first limit current mirror and thus modify the current in the reference leg and thus the mirror leg of the first limit current mirror and thus adjust the voltage level of the first reference limit signal; and
    a pulse width modulation/pulse frequency modulation control circuit configured for receiving the first reference limit signal, configured for comparing an amplitude of the first reference limit signal with a feedback signal from a power switching section of the DC-to-DC converter and configured for generating a first reset control signal and a second reset control signal for controlling deactivation of the first switch and a second switch of the DC-to-DC converter;
    wherein the first current limit circuit and the pulse width modulation/pulse frequency modulation control circuit are configured for varying a current limit that controls an interval and duration of time at which the switching section of the DC-to-DC converter is switched to permit the DC-to-DC converter to manage large changes in an output current load of the DC-to-DC converter while operating in the discontinuous operation mode.

2. The hysteretic mode control circuit of claim 1 wherein the first current limit circuit comprises:
    a first matching switch configured with geometry and impurity implantations matching the first switch of the DC-to-DC converter and connected to receive the first reset control signal generated by the pulse width modulation/pulse frequency modulation control circuit; and
    a first reference current source connected to the first matching switch to develop the first reference limit signal for controlling the turning on and turning off the first switch.

3. The hysteretic mode control circuit of claim 1 further comprising:
    a second current limit circuit configured for determining a second reference limit signal that is used for controlling activation of the second switch of the switching section of the DC-to-DC converter for transferring current to the load device placed at the output of the DC-to-DC converter; and
    wherein the pulse width modulation/pulse frequency modulation control circuit is configured for receiving the second reference limit signal, configured for comparing an amplitude of the second reference limit signal with the feedback signal from the power switching section of the DC-to-DC converter, and configured for employing the first and second reference limit signals for generating the first and second reset controls activation of the first switch and the second switch.

4. The hysteretic mode control circuit of claim 1 wherein the first dynamic current limit circuit further comprises a first load device connected to the mirror leg of the first limit current mirror for developing the first reference limit voltage.

5. The hysteretic mode control circuit of claim 1 wherein the first current limit circuit comprises:
a variable current limit circuit comprising:
a difference amplifier configured for receiving the first reference limit signal and the feedback signal from the power switching section of the DC-to-DC converter and configured for amplifying difference in the amplitude of the feedback signal and the amplitude of the first reference limit signal to generate a second control signal;
a current sense circuit configured for generating a sense signal determined by a current through the first switching device;
a differential current source configured for receiving the second control signal and from the second control signal setting a current limit for the current through the first switching device, and configured for receiving the sense signal and comparing the sense signal with the current limit to generate a driver control signal; and
a driver control circuit configured for receiving the first control signal developed by a feedback comparator of the DC-to-DC converter and the second control signal developed by the differential current source for controlling activation the first switching device of a switching section of the DC-to-DC converter for transferring current to a load device placed at the output of the DC-to-DC converter.

6. The hysteretic mode control circuit of claim 3 wherein the second current limit circuit comprises:
a second matching switch configured with geometry and impurity implantations matching the second switch and connected to receive the second reset control signal; and
a second reference current source connected to the second matching switch to develop the second reference limit signal for controlling the turning on and turning off the second switch.

7. The hysteretic mode control circuit of claim 3 wherein the second current limit circuit comprises:
a second dynamic current limit circuit comprising:
a second reference current source configured for providing a second maximum reference current;
a second limit current mirror connected such that a reference leg of the second limit current mirror receives the second maximum reference current and configured such that a mirror leg of the second limit current mirror is connected to provide a second reference limit signal for an output of the second current limit circuit to determine an interval and duration of time at which the second switch of the power switching section is switched to provide current to the filter section of the DC-to-DC converter;
a comparator connected to receive a second reference limit signal and the feedback signal from the output of the DC-to-DC converter and configured for determining if the feedback signal is greater than or less than the second reference limit signal to generate an output signal; and
a comparison switching device connected to receive the output signal of the comparator that is activated or deactivated to divert current from the reference leg of the second limit current mirror and thus modify the current in reference leg and thus the mirror leg of the second limit current mirror and thus adjust the voltage level of the second reference limit signal.

8. The hysteretic mode control circuit of claim 5 wherein the variable current limit circuit further comprises a fixed ramp current source connected in parallel with the differential current source and configured for providing a compensation current that is summed with the differential current source for providing compensation to prevent a sub-harmonic oscillation.

9. The hysteretic mode control circuit of claim 7 wherein the second dynamic current limit circuit further comprises a second load device connected to the mirror leg of the second limit current mirror for developing the second reference limit voltage.

10. A DC-to-DC converter comprising:
a hysteretic mode control circuit configured for varying the current limit that controls an interval and duration of time at which the power switching section of the DC-to-DC converter is switched to permit the DC-to-DC converter to manage large changes in an output current load of the DC-to-DC converter while operating in the discontinuous operation mode, the hysteretic mode control circuit comprising:
a first current limit circuit configured for determining a first reference limit signal that is used for controlling activation a first switch of the switching section of the DC-to-DC converter for transferring current to a load device placed at an output of the DC-to-DC converter, wherein the first current limit circuit comprises:
a first dynamic current limit circuit comprising:
a first reference current source configured for providing a first maximum reference current,
a first limit current mirror connected such that a reference leg of the first limit current mirror receives the first maximum reference current and configured such that a mirror leg of the first limit current mirror is connected to provide the first reference limit signal for an output of the first current limit circuit to determine the switching interval and duration of the first switch to provide a current to the filter section of the DC-to-DC converter,
a comparator connected to receive first reference limit signal and a feedback signal from the output of the DC-to-DC converter and configured for determining if the feedback signal is greater than or less than the first reference limit signal to generate an output signal, and
a comparison switching device connected to receive the output signal of the comparator that is activated or deactivated to divert a current from the reference leg of the first current limit mirror and thus modify the a current in the reference leg and thus the mirror leg of the first limit current mirror and thus adjust the voltage level of the first reference limit signal; and
a pulse width modulation/pulse frequency modulation control circuit configured for receiving the first reference limit signal, configured for comparing an amplitude of the first reference limit signal with a feedback signal from a power switching section of the DC-to-DC converter and configured for generating a first control signal and a second reset control signal for controlling deactivation of a first switch and a second switch of the DC-to-DC converter.

11. The DC-to-DC converter of claim 10 wherein the hysteretic mode control circuit the first current limit circuit comprises:
a first matching switch configured with geometry and impurity implantations matching the first switch and connected to receive the first reset control signal generated by the pulse width modulation/pulse frequency modulation control circuit; and
a first reference current source connected to the first matching switch to develop the first reference limit signal for controlling the turning on and turning off the first switch.

12. The DC-to-DC converter of claim 10 the hysteretic mode control circuit further comprises:
a second current limit circuit configured for determining a second reference limit signal that is used for controlling activation of the second switch of the switching section of the DC-to-DC converter for transferring current to a load device placed at the output of the DC-to-DC converter; and
wherein the pulse width modulation/pulse frequency modulation control circuit is configured for receiving the second reference limit signal, configured for comparing an amplitude of the second reference limit signal with the feedback signal from the power switching section of the DC-to-DC converter, and configured for employing the first and second reference limit signals for generating the first and second reset controls for the data flip-flops for controlling activation of the first switch and the second switch of the DC-to-DC converter.

13. The DC-to-DC converter of claim 10 wherein the first dynamic current limit circuit further comprises a first load device connected to the mirror leg of the first limit current mirror for developing the first reference limit voltage.

14. The DC-to-DC converter of claim 10 wherein the first current limit circuit comprises:
a variable current limit circuit comprising:
a difference amplifier configured for receiving the first reference limit signal and the feedback signal from the power switching section of the DC-to-DC converter and configured for amplifying difference in the amplitude of the feedback signal and the amplitude of the first reference limit signal to generate a second control signal;
a current sense circuit configured for generating sense signal determined by a current through the first switching device; and
a differential current source configured for receiving the second control signal and from the second control signal setting a current limit for the current through the first switching device, and configured for receiving the sense signal and comparing the sense signal with the current limit to generate a driver control signal; and
a driver control circuit configured for receiving the first control signal developed by a feedback comparator of the DC-to-DC converter and a second control signal developed by the variable current limit circuit for controlling activation the first switching device of a switching section of the DC-to-DC converter for transferring current to a load device placed at the output of the DC-to-DC converter.

15. The DC-to-DC converter of claim 12 wherein the second current limit circuit comprises:
a second matching switch configured with geometry and impurity implantations matching the second switch and connected to receive the second reset control signal; and
a second reference current source connected to the second matching switch to develop the second reference limit signal for controlling the turning on and turning off the second switch.

16. The DC-to-DC converter of claim 12 wherein the second current limit circuit comprises:
a second dynamic current limit circuit comprising:
a second reference current source configured for providing a second maximum reference current;
a second limit current mirror connected such that a reference leg of the second limit current mirror receives the second maximum reference current and configured such that a mirror leg of the second limit current mirror is connected to provide a second reference limit signal for an output of the second current limit circuit to determine an interval and duration of time at which the second switch of the power switching section is switched to provide current to the filter section of the DC-to-DC converter;
a comparator connected to receive a second reference limit signal and the feedback signal from the output of the DC-to-DC converter and configured for determining if the feedback signal is greater than or less than the second reference limit signal to generate an output signal; and
a comparison switching device connected to receive the output signal of the comparator that is activated or deactivated to divert current from the reference leg of the second limit current mirror and thus modify the current in reference leg and thus the mirror leg of the second limit current mirror and thus adjust the voltage level of the second reference limit signal.

17. The DC-to-DC converter of claim 14 wherein the variable current limit circuit further comprises a compensation current source connected in parallel with the differential current source and configured for providing a fixed ramp current that is summed with the adjustable differential current source for providing compensation to prevent a sub-harmonic oscillation.

18. The DC-to-DC converter of claim 16 wherein the second dynamic current limit circuit further comprises a second load device connected to the mirror leg of the second limit current mirror for developing the second reference limit voltage.

19. A method for providing hysteretic mode control by supervising a switching interval and duration of a power switching section of a DC-to-DC converter to permit the DC-to-DC converter to manage large changes in an output current load of the DC-to-DC converter during a sleep mode, the method comprising the steps of:
determining a first limit signal proportional to a first limit current flowing in the low pass filter of the DC-to-DC converter, wherein determining the first limit signal comprises the steps of:
setting a maximum reference current;
determining a difference between a reference voltage of the DC-to-DC converter and a feedback voltage of the DC-to-DC converter as a difference voltage;
converting the difference voltage to a difference current;
subtracting the difference current from the maximum reference current to form a first variable limit current;

mirroring the first variable limit current; and
converting the first variable limit current to the first limit signal;
comparing an input signal of the low pass filter with the first limit signal;
resetting a first latching circuit for disabling a first switching device to prevent a current from flowing into the low pass filter, when the input signal is greater than a first limit signal; and
allowing the current to continue to flow into the low pass filter, when the input signal is less than the first limit signal by not resetting the first latching circuit and not disabling the first switching device.

20. The method for providing hysteretic mode control of claim 19 further comprising the steps of:
determining a second limit signal proportional to a second limit current flowing in the low pass filter of the DC-to-DC converter;
comparing the input signal of the low pass filter with the second limit signal;
resetting a second latching circuit for disabling a second switching device to prevent a current from flowing from the low pass filter, when the input signal is less than a second limit signal; and
allowing a current to continue to flow from the low pass filter, when the input signal is greater than the first limit signal by not resetting the second latching circuit and not disabling the second switching device.

21. The method for providing hysteretic mode control of claim 19 wherein determining the second limit signal comprises the steps of:
setting a minimum reference current;
determining a difference between a reference voltage of the DC-to-DC converter and a feedback voltage of the DC-to-DC converter as a difference voltage;
converting the difference voltage to a difference current;
subtracting the difference current from the minimum reference current to form a second variable limit current;
mirroring the second variable limit current; and
converting the second variable limit current to the second limit signal.

* * * * *

UNITED STATES PATENT AND TRADEMARK OFFICE
CERTIFICATE OF CORRECTION

PATENT NO.       : 9,444,342 B2
APPLICATION NO.  : 14/516859
DATED            : September 13, 2016
INVENTOR(S)      : Mark Childs It is certified that error appears in the above-identified patent and that said Letters Patent is hereby corrected as shown below:

In the Drawings

Please replace Figs. 4, 5 with Figs. 4, 5, as shown on the attached pages.

Signed and Sealed this
Twenty-first Day of April, 2020

Andrei Iancu
*Director of the United States Patent and Trademark Office*